H. H. MONTAGUE.
LAWN MOWER.
APPLICATION FILED APR. 10, 1916.
1,221,204.
Patented Apr. 3, 1917.
2 SHEETS—SHEET 2.
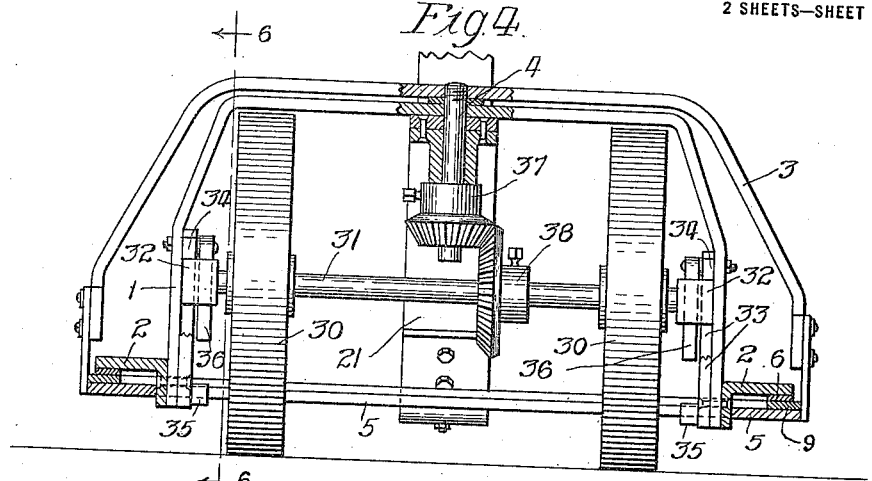
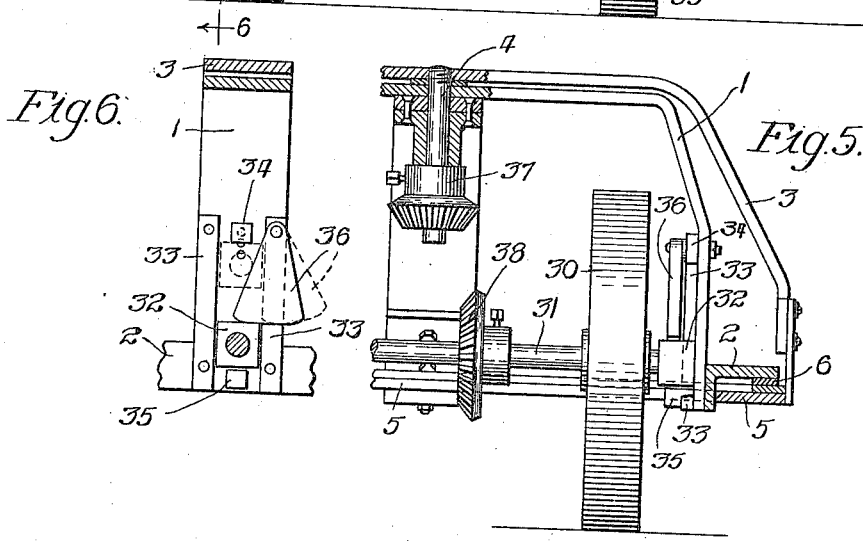
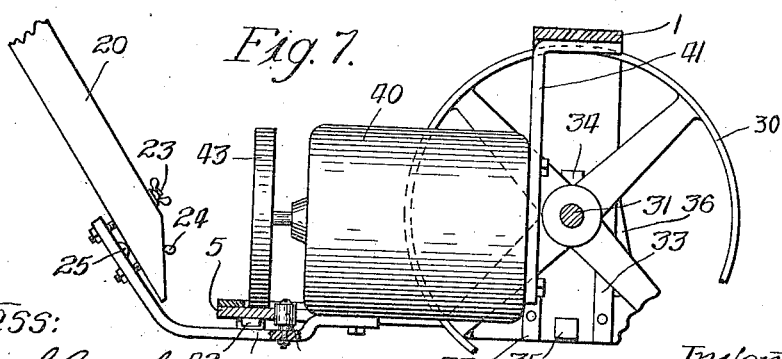
Witness:
Harry S. Gaither
Inventor
H. H. Montague,
By Chamberlin Frendenreich
attys.

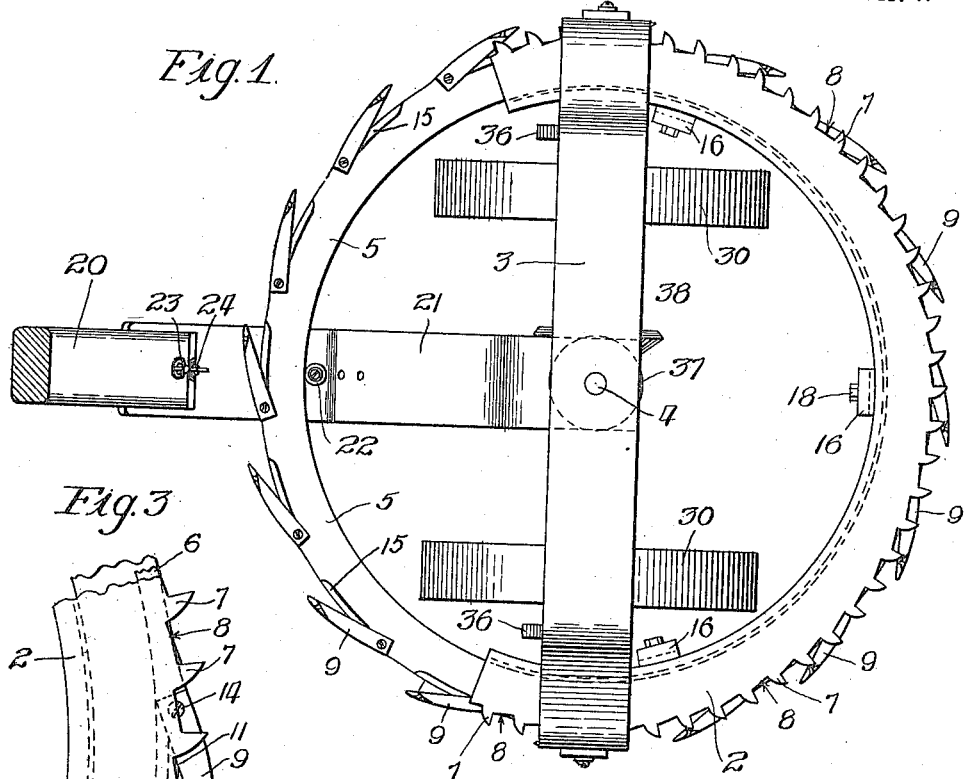

UNITED STATES PATENT OFFICE.

HUBERT H. MONTAGUE, OF TRAVERSE CITY, MICHIGAN.

LAWN-MOWER.

1,221,204.   Specification of Letters Patent.   Patented Apr. 3, 1917.

Application filed April 10, 1916. Serial No. 90,053.

*To all whom it may concern:*

Be it known that I, HUBERT H. MONTAGUE, a citizen of the United States, residing at Traverse City, county of Grand Traverse, State of Michigan, have invented a certain new and useful Improvement in Lawn-Mowers, and declare the following to be a full, clear, and exact description of the same, such as will enable others skilled in the art to which it pertains to make and use the same, reference being had to the accompanying drawings, which form a part of this specification.

The present invention has for its object generally to simplify and improve the construction and operation of lawn mowers, more particularly those in which the cutting action is produced by revolving a movable shearing member horizontally past a stationary horizontal shearing edge.

A subsidiary object of the invention is to improve the shearing or cutting devices so as to make the shearing action positive and prevent the grass from clogging the same.

A further subsidiary object of the present invention is to provide means for pressing the coöperating shearing members together, during the shearing process, without creating any considerable friction or otherwise consuming any considerable amount of energy or causing any considerable amount of wear.

A further subsidiary object of my invention is to make provision for replacing worn shearing members at a slight cost.

A further subsidiary object of the invention is to provide means for quickly and conveniently elevating the cutting mechanism to permit the mower to pass over obstacles when being moved about from place to place.

A further object of the invention is to produce a simple lawn mower construction in which the cutting mechanism is power driven.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a lawn mower arranged in accordance with a preferred form of my invention; a portion of the handle being broken away;

Fig. 2 is a central vertical section through the mower;

Fig. 3 is a plan view of a fragment of the shearing members on an enlarged scale in order more clearly to show the arrangement;

Fig. 4 is a section taken at right angles to the plane of Fig. 2 just at one side of the transverse axis of the machine;

Fig. 5 is a view similar to Fig. 4, showing only one-half of the mower, with the shearing members elevated in an idle position;

Fig. 6 is a section taken approximately on line 6—6 of Fig. 4, showing the parts occupying the same positions as in Fig. 5; and Fig. 7 is a longitudinal vertical section illustrating a mower having motor driven shearing mechanism.

Reference being had to Figs. 1 to 6 of the drawings, 1 represents an inverted U-shaped strap or yoke to the lower ends of the arms of which is secured an angle iron, 2, bent into the form of an arc having a length approximately that of a semi-circle, one of the flanges of the member 2 being vertical and the other flange projecting outwardly therefrom in a horizontal plane. Overlying the member 1 is a somewhat similar but slightly larger member, 3; the members 1 and 3 being connected together at their common vertical axis in such a manner that the member 3 may revolve about a vertical axis on the member 1 as a support. In the arrangement shown, there is a stub shaft, 4, screw threaded at its upper end into the top bar of the member 3 and passing down through the corresponding part in the member 1. On the lower ends of the arms of the member 3 is supported a flat ring, 5, which underlies the horizontal flange of the angle iron, 2, but is located at a slight distance below the same.

Secured on the under side of the horizontal member of the angle iron, 2, is a hardened steel segment, 6, extending throughout the length of the member 2 in proximity to its outer edge. The outer edge of the member 2 and its attached member 6 is preferably formed so as to provide cutting or shearing edges alternating with teeth as best illustrated in the enlarged view of Fig. 3. At short intervals apart, say about half an inch in an ordinary small lawn mower, are teeth, 7, while the peripheral portions between the teeth, as indicated at 8, are preferably a departure from a circle described about the vertical axis of the machine, the radial distance preferably increasing gradually from the base of one tooth to the base of the next; the shorter radius being at the point first reached by the coöperating movable shearing member.

On the upper side of the revoluble ring, 5, at a suitable distance apart, are shearing blades or knives, 9, preferably more than eight in number, preferably in the form of removable members of hardened material secured to the ring and adapted to bear against the under face of the hardened strip or segment, 6. The members 9 are preferably so located that each has a shearing edge, 10, making an acute angle with a tangent drawn at the point of intersection of this edge with a circle described about the axis of rotation; it having been found that an angle of twenty degrees gives very good results. The arrangement is further such that the extreme inner end of the shearing edge, 10, that is the point where the base of the projecting knife or blade meets the main body of the ring, as indicated at 11, is at a slightly greater radial distance from the axis of rotation than that end of the shearing edge 8 which is nearest the axis of rotation and is at a greater radial distance from the axis than that end of the shearing edge 8 which is farthest from the axis. The result is that the point 11, crosses each of the shearing edges 8 at an intermediate point, thus insuring that grass caught at the base of the shearing blade or knife will be positively sheared off and will not have an opportunity of wedging itself between the coöperating shearing members. The teeth 7, it will be understood, are simply for the purpose of preventing the grass from sliding out from between the coöperating shearing edges and are not, themselves, shearing members. The general arrangement just described also makes provision, as in my prior Patent No. 1153943, for causing the moving shearing edge to be drawn inwardly toward the stationary shearing edge as the shearing progresses, this process being repeated between each two consecutive teeth on the stationary member. I prefer to make the number of revolving knives or blades prime to the number of stationary shearing edges, thus causing the knives or blades in the working zone to cut one at a time instead of all together.

The material of which the ring, 5, is made is preferably extended out underneath the blades or knives, 9, and is continued somewhat beyond the outer end of the latter as indicated at 12. Each of the portions, 12, has an upwardly projecting lug or shoulder, 13, against which the outer end of the corresponding blade or knife, 9, bears; each blade or knife, 9, being held in place by means of a screw, 14, or other fastening device extending through the same and holding it up to the shoulder or lug, 13. The upper surface of the ring, 5, is raised opposite the shearing edges of the blades or knives, 9, so as to bring it into the plane of the top faces of these blades or knives. These raised portions of the ring, which are indicated at 15, may be produced in any desired way, being, if desired, parts of the knives or blades themselves, their purpose being simply to assist the cutting process and prevent the mechanism from being clogged with grass.

While the stationary segment, 2, is supported from the inside, the ring, 5, is supported from the outside, thus permitting the inner edge of the ring to be brought close to the depending flange of the member 2 and permitting the employment of holding clamps which will always hold the rotatable member up against the stationary member. These clamps are best shown in Figs. 1 and 2, each consisting simply of a small L-shaped member, 16, one arm of which lies inside of the vertical flange of the member 2 at the front end of the machine while the other arm extends outwardly underneath the ring 5. The extreme upper end of the vertical arm of the member 16 is preferably provided with a heel, 17, on which it may rock when a holding screw, 18, passing through the arm and into the member 2 at a point below the heel, is adjusted. On the outer end of the clamp or bracket is an anti-friction roller, 19, which engages with the under side of the ring, 5. It will be seen that by tightening the screw 18, the clamp is caused to rock in a direction to press the roller upwardly and thus press the rotatable shearing member against the under side of the stationary shearing member; but, by reason of the rolling support afforded by the roller, 19, very little power will be consumed in maintaining this effective shearing relation.

In the arrangement shown, the machine is actuated by means of a handle, 20, attached to the lower end of a Z-shaped plate or bar, 21, whose upper end engages with the under side of the cross bar of the yoke, 1, and is perforated to permit the passage of the shaft 4. The ring, 5, overlies the lower horizontal part of the member 21 and is engaged by an anti-friction roller, 22, carried by the latter. In order that the angle of inclination of the handle, 20, may be varied, I have secured it to the member 21 by means of two bolts, 23 and 24, lying on opposite sides of a fulcrum, 25, on the member 21. By adjusting the bolts 23 and 24 the handle may be rocked on the fulcrum.

The machine as a whole is of course mounted on wheels, there being in the present instance, a pair of wheels, 30, mounted in the usual way upon an axle, 31, the ends of which extend into proximity to the inner faces of the vertical arms of the yoke 1 and are there journaled in bearing boxes, 32, which engage with said arms. The journal boxes are movable up and down between suitable guides, 33, their movement being limited by upper and lower stops, 34 and 35, respectively. On each of the vertical arms of the member 1, in rear of the bearing boxes, 32, is a pendulum, 36, so disposed that it tends always to position itself across the space between the guides 33. The parts are so proportioned that the entire structure, except the wheeled axle, may be lifted high enough to permit the pendulums to swing by gravity above the journal boxes; thus holding the shearing devices in an elevated idle position. While the machine is in this condition it may be pushed about over rough places or obstructions without danger that the shearing mechanism will bump into something. When the pendulums are swung back, the entire structure drops down until the upper stops, 34, rest on the journal boxes, the shearing devices being now in their lowered, working positions. The shifting of the mechanism from the working to the idle position is accomplished by simply pushing the machine forward rapidly and then giving it a slight backward jerk which causes the parts connected to the handle to rise, permitting the pendulums to swing naturally into their holding positions. When it is desired to drop the shearing mechanism, all that it is necessary to do is to tilt the machine back far enough to permit the pendulums to swing by gravity out of their holding positions.

The rotation of the movable shearing member is effected by means of complementary bevel gears, 37 and 38, fixed respectively on the stub shaft, 4, and on the axle, 31. When the shearing mechanism is in its lowered, working position, as indicated in Figs. 2 and 4, the gears 37 and 38 mesh with each other. As soon as the shearing mechanism is raised into the position indicated in Figs. 5 and 6, the gear wheel, 37, is lifted away from the gear wheel, 38, and the driving connection between the axle and the cutting means is interrupted.

The height at which the shearing devices lie above the surface over which the wheels are traveling may be regulated by adjusting the stops, 34, in the vertical direction; the gear, 37, being moved up or down the shaft 4 at the same time, in order to maintain the proper driving connection. The stops, 34, may be made adjustable in any suitable or convenient manner as, for example, by making them the heads of or parts of bolts or studs each adapted to be inserted in any one of a series of holes distributed vertically one above the other in the member 1.

In Fig. 7 I have shown a modification in which, instead of the gear drive, I employ a motor, 40, mounted upon a Z-shaped member, 41, which corresponds to the member 21 in the other arrangement, but is shaped somewhat differently. On the member 41 beneath the ring 5 is an anti-friction roller, 42. The ring is driven by a friction wheel or disk, 43, fixed to the motor shaft and engaging with the upper surface of the ring, preferably at a point above the roller 42. With this arrangement, the operation of the cutting means does not depend upon the movements of the machine as a whole but is independent thereof and, of course, less manual power is required to push the machine, than is required to operate the other form of machine.

While I have illustrated and described with great particularity only a single preferred embodiment of my invention, with a single modification, I do not desire to be limited to the exact structural details thus illustrated and described; but intend to cover all forms and arrangements which come within the terms employed in the definitions of my invention constituting the appended claims.

I claim:

1. In a machine of the character described, a stationary member having a horizontally-disposed shearing edge, a coöperating horizontally-revolving member having a shearing edge extending beyond the aforesaid shearing edge, the shearing edge on the stationary member following generally the arc of a circle having its center at the axis of rotation of the revolving member, and teeth projecting outwardly at intervals from the shearing edge of the said stationary member.

2. In a machine of the character described, a horizontal stationary member having a curved edge forming a shearing edge, teeth distributed at intervals along and projecting outwardly from said edge, and a coöperating horizontally-revolving member having a shearing edge extending beyond the aforesaid edge.

3. In a machine of the character described, a horizontal stationary member having a curved edge forming a shearing edge, teeth distributed at intervals along and projecting outwardly from said edge, and a coöperating horizontally-revolving member having a shearing edge extending beyond the aforesaid edge, the parts being so constructed and arranged that the movable shearing edge is gradually drawn inwardly relatively to each portion of the stationary shearing edge between each tooth and the next succeeding tooth when in shearing relation thereto.

4. In a machine of the character described, a stationary plate having an approximately arc-shaped outer edge forming a shearing edge, and a flat horizontally-revoluble ring lying against said plate and having a shearing edge projecting beyond the aforesaid edge and making an acute angle therewith, the arrangement being such that the revolving shearing edge is gradually drawn inwardly relatively toward the coöperating edge during a portion of each revolution.

5. In a machine of the character described, a stationary plate having an approximately arc-shaped outer edge forming a shearing edge, a flat horizontally-revoluble ring lying against said plate and having a shearing edge projecting beyond the aforesaid edge and making an acute angle therewith, the arrangement being such that the revolving shearing edge is gradually drawn inwardly relatively toward the coöperating edge during a portion of each revolution, and teeth projecting outwardly at intervals from said stationary shearing edge.

6. In a machine of the character described, a stationary plate having an approximately arc-shaped outer edge, a strip of hardened material secured to the under side of said plate and following said edge, a flat horizontally-revoluble ring lying beneath said plate, said ring having distributed blades of hardened material lying against the under side of the aforesaid strip and projecting beyond the edge of the same, each blade having an inner shearing edge forming an acute angle with the edge of the overlying strip.

7. In a machine of the character described, a stationary plate having an approximately arc-shaped outer edge, a strip of hardened material secured to the under side of said plate and following said edge, a flat horizontally-revoluble ring lying beneath said plate, said ring having distributed blades of hardened material lying against the under side of the aforesaid strip and projecting beyond the edge of the same, each blade having an inner shearing edge forming an acute angle with the edge of the overlying strip, and teeth projecting outward at intervals from the edge of said strip.

8. In a machine of the character described, a stationary plate having an approximately arc-shaped outer edge, a strip of hardened material secured to the under side of said plate and following said edge, a flat horizontally-revoluble ring lying beneath said plate, said ring having distributed blades of hardened material lying against the under side of the aforesaid strip and projecting beyond the edge of the same, each blade having an inner shearing edge forming an acute angle with the edge of the overlying strip, and a clamp device including an anti-friction pressure member for pressing said ring upwardly to hold the blades in contact with said strip.

9. In a machine of the character described, a stationary arc-shaped angle iron having a vertical flange and an outwardly-projecting horizontal flange, a horizontally-revoluble ring underlying said horizontal flange and surrounding the vertical flange, and coöperating shearing devices at the outer edge of said horizontal flange and at the periphery of said ring.

10. In a machine of the character described, a stationary arc-shaped angle iron having a vertical flange and an outwardly-projecting horizontal flange, a horizontally-revoluble ring underlying said horizontal flange and surrounding the vertical flange, coöperating shearing devices at the outer edge of said horizontal flange and at the periphery of said ring, an L-shaped clamp having one arm lying inside of said vertical flange and the other arm underlying said ring, an anti-friction device on the latter arm for engaging with the under side of said ring, and means for adjustably securing said clamp on said vertical flange so as to vary the pressure of the anti-friction device on said ring.

11. In a machine of the character described, a cutting member comprising a flat ring having approximately tangential peripheral teeth, and shearing members of hardened material detachably secured on said teeth.

12. In a machine of the character described, a cutting member comprising a flat ring having approximately tangential peripheral teeth, and shearing members of hardened material detachably secured on said teeth, the outer ends of said teeth projecting beyond said shearing members.

13. In a machine of the character described, a cutting member comprising a flat ring having approximately tangential peripheral teeth, shearing members of hardened material detachably secured on said teeth, the outer ends of said teeth projecting beyond said shearing members, and upwardly-projecting shoulders on the outer ends of said teeth for engaging with the ends of the shearing members.

14. In a machine of the character described, a flat ring having secured thereon and projecting beyond the periphery thereof approximately tangential shearing members, the surface of the ring being raised for some distance from each point where the shearing member crosses the periphery.

15. In a machine of the character described, an arc-shaped stationary member having a peripheral shearing edge, a vertical yoke having the lower ends of its arms secured to the inner edge of said member, a flat ring underlying said member and having approximately tangential shearing edges adapted to coöperate with the aforesaid shearing edge, and a yoke superimposed and revoluble upon the aforesaid yoke and having the lower ends of its arms secured to the outside edge of said ring.

16. In a machine of the character described, a horizontal stationary member having a curved edge forming a shearing edge, holding teeth distributed at intervals along and projecting outwardly from said edge, and a coöperating horizontally-revolving member having shearing knives or blades extending outwardly beyond said edge, the number of teeth being prime to the number of said knives or blades.

17. In a machine of the character described, a stationary plate having an approximately arc-shaped outer edge, a strip of hardened material secured on one side of said plate and following said edge, a flat horizontally-revoluble ring concentric with said plate, said ring having distributed blades of hardened material engaging with the aforesaid strip and projecting beyond the edge of the same, each blade having an inner shearing edge forming an acute angle with the shearing edge of the strip.

18. In a machine of the character described, a stationary arc-shaped angle iron having a vertical flange and an outwardly projecting horizontal flange, a horizontally-revoluble ring surrounding the vertical flange and lying in proximity to the said horizontal flange, and coöperating shearing devices at the outer edge of said horizontal flange and at the periphery of said ring.

19. In a machine of the character described, a stationary horizontal plate having an approximately arc-shaped outer edge, a horizontally-revoluble ring lying in proximity to said plate, coöperating shearing devices at the outer edges of said plate and at the periphery of said ring, and a plurality of distributed clamps between said plate and said ring and holding them against relative vertical displacement while permitting relative rotary movements.

20. In a machine of the character described, an arc-shaped stationary member having a peripheral shearing edge, a vertical yoke having the lower ends of its arms secured to the inner edge of said member, a flat ring lying in proximity to said member and having approximately tangential shearing edges adapted to coöperate with the aforesaid shearing edge, and a yoke superimposed and revoluble upon the aforesaid yoke and having the lower ends of its arms secured to the outside edge of said ring.

In testimony whereof, I sign this specification.

HUBERT H. MONTAGUE.

Copies of this patent may be obtained for five cents each, by addressing the "Commissioner of Patents, Washington, D. C."